US008598946B2

(12) United States Patent
Drost et al.

(10) Patent No.: US 8,598,946 B2
(45) Date of Patent: Dec. 3, 2013

(54) DIGITALLY PROGRAMMABLE HIGH VOLTAGE CHARGE PUMP

(75) Inventors: Brian G. Drost, Corvallis, OR (US); Aaron J. Caffee, Scappoose, OR (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 13/460,952

(22) Filed: May 1, 2012

(65) Prior Publication Data

US 2013/0293284 A1 Nov. 7, 2013

(51) Int. Cl.
*G05F 1/10* (2006.01)
(52) U.S. Cl.
USPC ............................................. 327/536; 363/60
(58) Field of Classification Search
USPC ........................................ 327/536; 363/59–60
See application file for complete search history.

(56) References Cited

U.S. PATENT DOCUMENTS

| 5,999,040 | A | * | 12/1999 | Do et al. .................... 327/536 |
| 6,052,295 | A | * | 4/2000 | Buchschacher et al. ........ 363/59 |
| 6,297,687 | B1 | * | 10/2001 | Sugimura ..................... 327/536 |
| 6,483,282 | B1 | * | 11/2002 | Bayer ........................... 323/315 |
| 6,798,274 | B2 | * | 9/2004 | Tanimoto ...................... 327/536 |
| 7,142,041 | B2 | * | 11/2006 | Somerville ................... 327/536 |
| 7,944,718 | B2 | * | 5/2011 | Takano .......................... 363/59 |
| 2002/0163376 | A1 | * | 11/2002 | Pappalardo et al. .......... 327/536 |
| 2004/0070999 | A1 | * | 4/2004 | Shearon .......................... 363/60 |
| 2006/0132417 | A1 | * | 6/2006 | Shigenobu et al. ............. 345/98 |
| 2006/0256591 | A1 | * | 11/2006 | Utsunomiya ................... 363/59 |
| 2009/0200956 | A1 | * | 8/2009 | Kojima ......................... 315/291 |
| 2010/0033232 | A1 | * | 2/2010 | Pan ............................... 327/536 |

OTHER PUBLICATIONS

Innocent, Manuel et al., "A Linear High Voltage Charge Pump for MEMS Applications in 0.18μm CMOS Technology," in Proceedings of 29th European Solid State Circuits Conference (ESSCIRC '03) 2003, 4 pages.
Ker, Ming-Dou et al., "Design of Charge Pump Circuit with Consideration of Gate-Oxide Reliability in Low-Voltage CMOS Processes," IEEE Journal of Solid-State Circuits, vol. 41, No. 5, May 2006, pp. 1100-1107.
Palumbo, Gaetano and Pappalardo, Domenico, "Charge Pump Circuits: An Overview on Design Strategies and Topologies," IEEE Circuits and Systems Magazine, First Quarter 2010, pp. 31-45.

* cited by examiner

*Primary Examiner* — Thomas J Hiltunen
(74) *Attorney, Agent, or Firm* — Abel Law Group, LLP

(57) ABSTRACT

A method of operating a programmable charge pump includes configuring each of a plurality of cascaded charge pump stages to be in a first set of charge pump stages or in a second set of charge pump stages based on an indicator of a target output voltage level. The first set of charge pump stages is configured to level-shift a first voltage level to a second voltage level. Each charge pump stage of the second set of charge pump stages has a disabled pump circuit portion. The second set of charge pump stages is configured to pass a version of the second voltage level to an output node of the programmable charge pump.

26 Claims, 7 Drawing Sheets

_US 8,598,946 B2_

DIGITALLY PROGRAMMABLE HIGH VOLTAGE CHARGE PUMP

BACKGROUND

1. Field of the Invention

This application is related to integrated circuits and more particularly, to integrated circuit charge pump voltage converters.

2. Description of the Related Art

In general, a charge pump circuit is a DC-to-DC voltage converter circuit that uses energy storage elements (e.g., capacitors) to increase or decrease a voltage level provided by a voltage power source. For example, a charge pump circuit may be used in an application that needs voltages greater than a power supply voltage level on a standard complementary metal-oxide-semiconductor (CMOS) integrated circuit. In some applications, different charge pump output voltage levels are needed at different times. Although a typical charge pump circuit can be designed to generate efficiently for a particular target output voltage or a narrow range of target output voltages, the typical charge pump circuit does not realize the same efficiency for a wide range of target output voltages. To generate multiple different target output voltages efficiently on-chip, a charge pump circuit for each target voltage level may be included on-chip. However, duplication of charge pump circuitry increases the area of the integrated circuit and may be cost-prohibitive. Accordingly, improved charge pump techniques are desired.

SUMMARY OF EMBODIMENTS OF THE INVENTION

In at least one embodiment of the invention, a method of operating a programmable charge pump includes configuring each of a plurality of cascaded charge pump stages to be in a first set of charge pump stages or in a second set of charge pump stages based on an indicator of a target output voltage level. The first set of charge pump stages is configured to level-shift a first voltage level to a second voltage level. Each charge pump stage of the second set of charge pump stages has a disabled pump circuit portion. The second set of charge pump stages is configured to pass a version of the second voltage level to an output node of the programmable charge pump.

In at least one embodiment of the invention, an apparatus includes a plurality of cascaded charge pump stages and a control circuit. The control circuit is operable to configure each of a plurality of the cascaded charge pump stages to be in one of a first set of charge pump stages or a second set of charge pump stages based on an indicator of a target output voltage level. Each charge pump stage in the first set of charge pump stages is configured to level-shift a first voltage level to a second voltage level. Each charge pump stage in the second set of charge pump stages has a disabled pump circuit portion. The second set of charge pump stages is configured to pass a version of the second voltage level to an output node.

In at least one embodiment of the invention, a method of operating a charge pump includes operating a charge pump stage in a mode of operation selected from a plurality of modes of operation based on a first control signal, a second control signal, and a third control signal. The plurality of modes includes a first mode and a second mode. In the first mode, the operating includes level-shifting a first voltage level of a signal on an input node to a second voltage level on an output node in response to the first and second control signals being clock signals having a first amplitude and a first phase relationship, and the third control signal being a first clock signal oscillating between a third voltage and a fourth voltage. In the second mode, the operating includes providing a version of the first voltage level to the output node in response to the first and second control signals having a second phase relationship, and the third control signal being a fixed amplitude signal.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
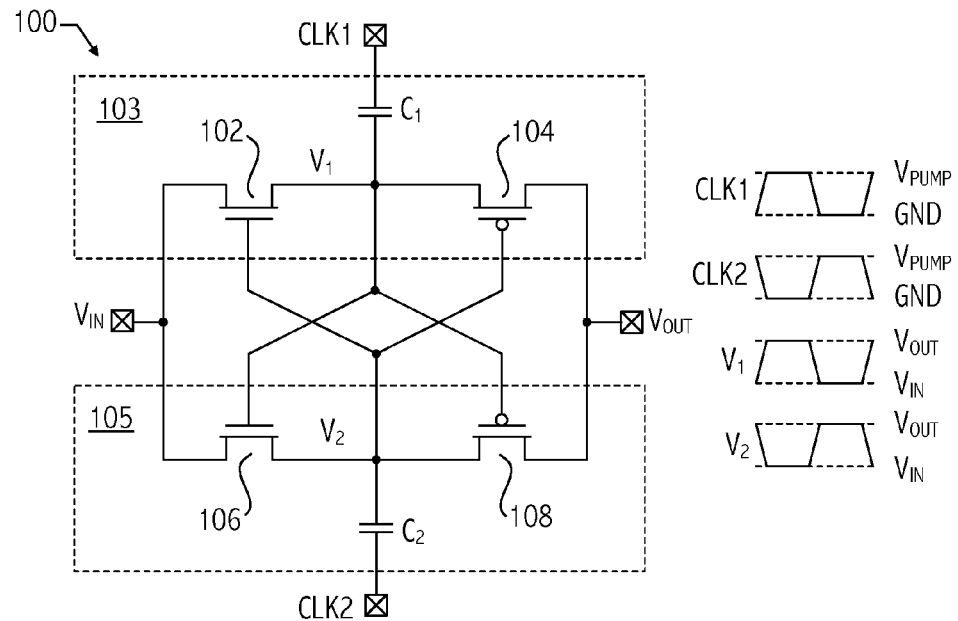
FIG. 1 illustrates a circuit diagram of a conventional latch-based charge pump stage and associated signal waveforms.

Referring to FIG. 1, a latch-based charge pump stage 100 boosts control clock CLK1 to generate level-shifted clock $V_1$, which is used to control devices 102 and 104. Similarly, latch-based charge pump stage 100 boosts control clock CLK2 to generate level-shifted clock $V_2$, which is used to control devices 106, and 108. Level-shifted clocks $V_1$ and $V_2$ oscillate between the voltage levels on the input node, $V_{IN}$ and the voltage level on the output node, $V_{OUT}$, where $V_{OUT}$ is a boosted version of $V_{IN}$. That is, $V_{OUT} = V_{IN} V_{PUMP}$. A typical voltage level of $V_{PUMP}$ is the voltage level of an on-chip regulated power supply (e.g., $V_{DD}$). Charge pump stage 100 is a double charge pump stage, i.e., it includes independent charge pump branches 103 and 105 that are coupled to the same input and output nodes. Since the two phases of the control clock signal, CLK1 and CLK2, are out-of-phase, level-shifted clocks $V_1$ and $V_2$ are also out-of-phase, resulting in branches 103 and 105 alternating pumping the output voltage level to a pumped voltage level, e.g., to a voltage level of approximately $V_{IN}+V_{PUMP}$.

Figure 2:
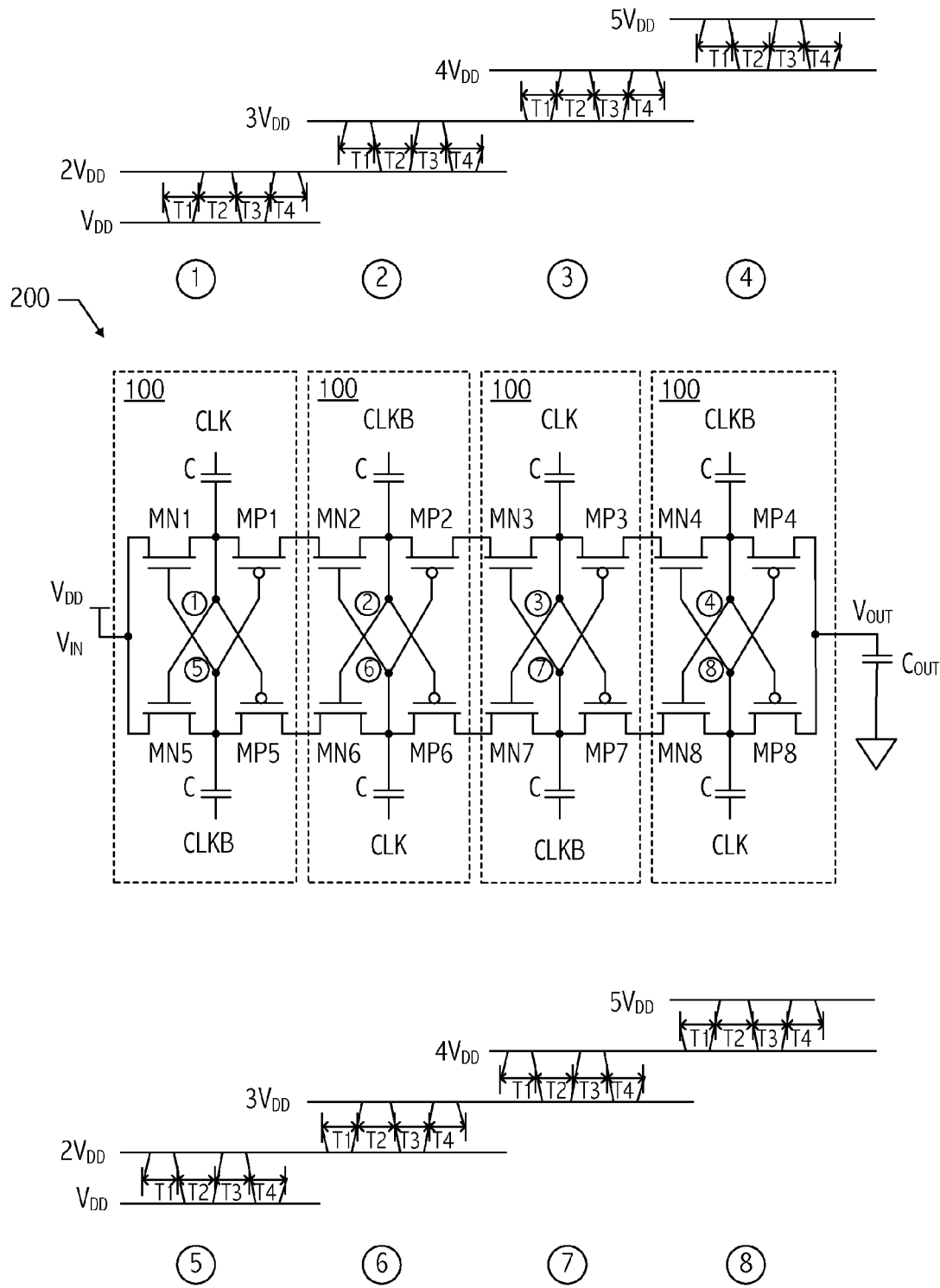
FIG. 2 illustrates a circuit diagram of a conventional charge pump circuit including cascaded charge pump stages of FIG. 1 and associated signal waveforms.

Referring to FIG. 2, multiple charge pump stages 100 are cascaded to form charge pump circuit 200. Control clock signals CLK and CLKB applied to adjacent pump stages are different phases of a two-phase clock signal, i.e., CLK and CLKB are out-of-phase with each other. Charge pump circuit 200 pumps the voltage on an input node (e.g., $V_{DD}$) to a voltage level of $V_{OUT}=V_{IN}(N\times V_{PUMP})$, where N is the number of charge pump stages 100 cascaded between the input node and the output node of the charge pump and $V_{PUMP}$ is the amplitude of the clock signals CLK and CLKB provided to the pump capacitors C (i.e., $V_{PUMP}=V_{DD}$). For example in charge pump circuit 200, four charge pump stages are cascaded, N equals four, and $V_{OUT}=V_{IN}+(4\times V_{PUMP})=5\times V_{DD}$.

During interval T1, CLK is low, CLKB is high, and a voltage difference between node 1 and node 5 of the first charge pump stage 100 is $-V_{DD}$ and the voltage difference between node 2 and node 6 of the second charge pump stage 100 is $V_{DD}$. Device MN1 is turned on and transfers charge from $V_{IN}$ to node 1. Device MN5 is off, which cuts off the path from node 5 back to the power supply. Devices MP5 and MN6 are turned on and transfer charge from node 5 to node 6. Devices MP1 and MN2 are off, thereby cutting off the path from node 2 back to node 1. During interval T2, CLK is high, CLKB is low, a voltage difference between node 1 and node 5 of first charge pump stage 100 is $V_{DD}$ and the voltage difference between node 2 and node 6 of the second charge pump stage 100 is $-V_{DD}$. The voltage difference between node 1 and node 5 becomes $V_{DD}$ and device MN1 is turned off, thereby cutting off the path from node 1 back to the power supply and turning on MN5 to transfer charge from the power supply to node 5. Devices MP5 and MN6 are turned off and cut off the path from node 6 back to node 5. Devices MP1 and MN2 are turned on and transfer charge from node 1 to node 2. The third and fourth charge pump stages 100 operate similarly to the operation of the first and second charge pump stages 100.

During operation of charge pump 200, the gate-to-source voltage ($V_{GS}$) and gate-to-drain voltage ($V_{GD}$) of all devices in charge pump 200 do not exceed $V_{DD}$, thereby preventing damage to the devices. However, the topology of charge pump 200 is not easily configurable as a charge pump having a programmable number of stages. For example, if control clocks CLK and CLKB provided to the pump capacitors C are shut off, charge pump stages 100 do not generate high voltage clocks $V_1$ and $V_2$, the charge pump stages 100 stop functioning and appear as open circuits.

Charge pump 200 receives an input voltage level from a fixed power supply through a linear voltage regulator. Charge pump 200 achieves the highest efficiency at the highest possible input voltage level, which is typically limited by the maximum voltage drop that can be placed across a device without damaging the device. However, as the input voltage level approaches a minimum voltage level, which may be determined by device threshold voltage levels, the performance degrades significantly. This limits the range of output voltages generated by charge pump 200, which includes a fixed number of stages.

Figure 3:
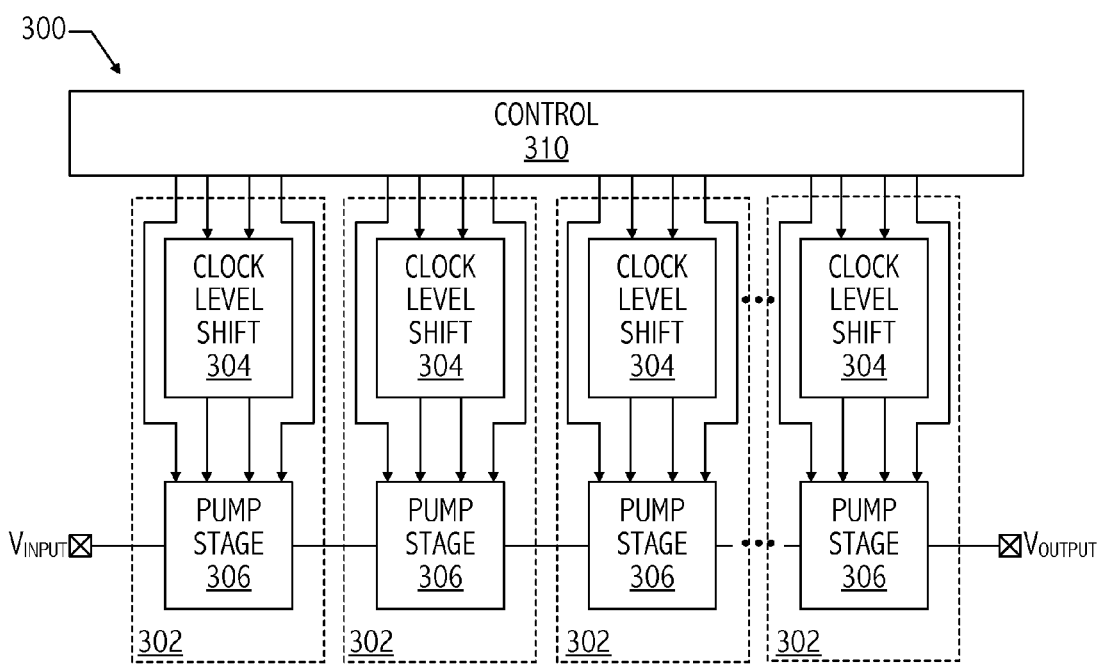
FIG. 3 illustrates a functional block diagram of a programmable charge pump circuit consistent with at least one embodiment of the invention.

Referring to FIG. 3, programmable charge pump 300 includes configurable charge pump stages 302 that convert a standard voltage level power supply voltage $V_{INPUT}$ (e.g., 3.3V) to an output voltage level $V_{OUT}$ selected from a wide range of voltage level outputs (e.g., from 0V to 40V). Charge pump stages 302 include clock level-shifting stages 304 that generate high voltage control signals from standard voltage level clock signals. Those high voltage control signals are used to alter the behavior of pump stages 306 without damaging devices in the pump stages 306. Control module 310 can disable one or more charge pump stages 302 by altering control signals provided to pump stages 306, e.g., by changing the phases of the high voltage control signals or by providing constant amplitude control signals instead of time-varying signals.

Figure 4A:
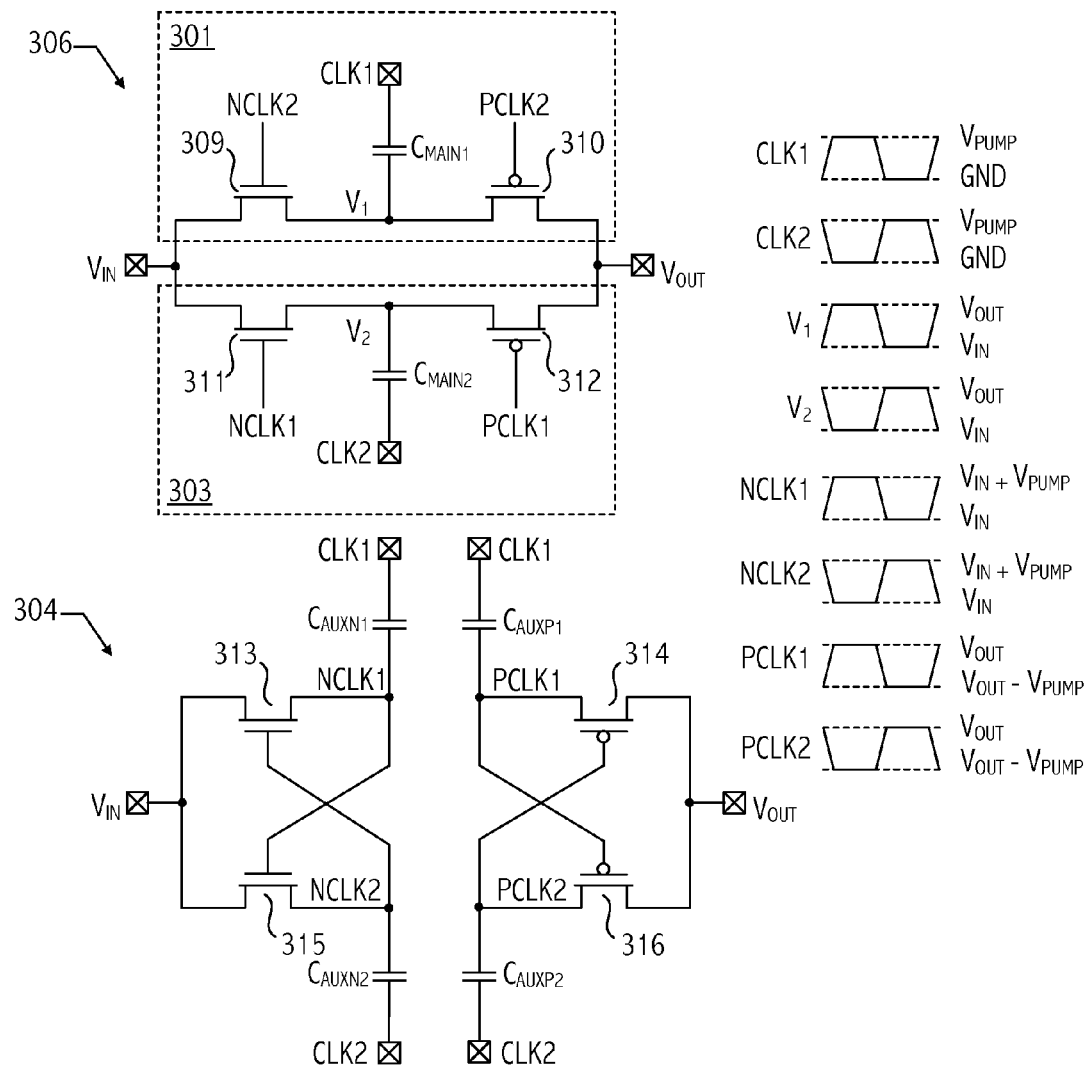
FIG. 4A illustrates circuit diagrams and associated signal waveforms of a charge pump stage configured as a charge pump in a first mode of operation consistent with at least one embodiment of the invention.

Referring to FIG. 4A, clock level-shifting stage 304 is a latch-based level-shifting stage that generates two two-phase control clock signals, NCLK1 and NCLK2, and PCLK1 and PCLK2 that are used by pump stage 306 to control devices 309, 311, 310, and 312, respectively. In clock level-shifting stage 304, when CLK1 is low (GND), and CLK2 is high ($V_{PUMP}$), the voltage difference between node NCLK1 and NCLK2 is approximately $-V_{PUMP}$. Therefore, device 313 is turned on, transferring charge from the input node to node NCLK1 and device 315 is off, which cuts off the path from node NCLK2 back to the input node. Similarly, the voltage difference between node PCLK1 and PCLK2 is approximately $-V_{PUMP}$. Device 316 is turned on and transfers charge from the output node to node PCLK2, raising the voltage on node PCLK2 by approximately $V_{OUT}$. Device 314 is off, thereby cutting off the path from the output node to node PCLK1.

When CLK1 is high, and CLK2 is low, the voltage difference between node NCLK1 and NCLK2 is $V_{PUMP}$. Therefore, device 315 is turned on, transferring charge from the input node to node NCLK2 to increase the voltage level of NCLK2 by approximately $V_{IN}$. Device 313 is off, which cuts off the path from node NCLK1 back to the input node. Similarly, the voltage difference between node PCLK1 and PCLK2 is $V_{PUMP}$. Device 314 is turned on and transfers charge from $V_{OUT}$ to node PCLK1, thereby raising the voltage on node PCLK1 by approximately $V_{OUT}$. Device 316 is off, thereby cutting off the path from node PCLK2 back to the output node. Control clocks NCLK1 and NCLK2 are out-of-phase with each other and oscillate between the voltage level on the input node, $V_{IN}$, and a pumped-up voltage level (e.g., $V_{IN} V_{PUMP}$). Similarly, control clocks PCLK1 and PCLK2 are out-of-phase with each other and oscillate between the voltage level on the output node, $V_{OUT}$, and a pumped-down voltage level (e.g., $V_{OUT}-V_{PUMP}$).

As illustrated in FIG. 4A, pump stage 306 is enabled, i.e., configured in a charge pump mode. Pump stage 306 includes two pump stage branches 301 and 303, each including a pumping capacitor and two complementary devices, (e.g., capacitor $C_{MAIN1}$ and devices 309 and 310 of branch 301 and capacitor $C_{MAIN2}$ and devices 311 and 312 of branch 303). When enabled for charge pump operation, branch 301 receives CLK1 on a terminal of pump capacitor $C_{MAIN1}$ and branch 303 receives CLK2 on a terminal of pump capacitor $C_{MAIN2}$. Devices 309, 310, 311, and 313 receive control clocks NCLK1, PCLK1, NCLK2, and PCLK2, respectively, each having an amplitude of $V_{PUMP}$. The complementary devices in branch 301 are enabled out-of-phase with each other and complementary devices of branch 303 are enabled out-of-phase with each other. Devices of the same type in branches 301 and 303 are enabled out-of-phase with each other.

During a first phase of clock signal CLK1, CLK1 is high, CLK2 is low, NCLK1 is high, PCLK1 is high, device 311 of branch 303 is on and device 312 is off. Device 311 transfers charge from the input node to charge node $V_2$ to the voltage level of $V_{IN}$. During the second phase of clock signal CLK1, additional charge is transferred to $V_2$ from CLK2 charging $C_{MAIN2}$, thereby boosting the voltage on node $V_2$ to $V_{OUT}$.

Device 312 is now on, allowing charge to be transferred from node $V_2$ to the output node. Note that since NCLK1 and PCLK1 have amplitudes of $V_{PUMP}$, but are referenced to $V_{IN}$ and $V_{OUT}$, respectively, the gate-to-source voltage and gate-to-drain voltages of devices 311 and 312 are sufficient to turn on those devices, without exceeding $V_{DD}$. Branch 301 operates similarly to branch 303, but transfers charge to the output node out-of-phase with branch 303.

Pump stage branches 301 and 303 each feed the output node $V_{OUT}$ in different half periods of the two-phase clock CLK1 and CLK2. The double pump stage topology has lower output ripple as compared to other, single pump stage circuits (e.g., a pump stage including only branch 301 or only branch 303). However, the use of separate clock level-shifting stage 304 is applicable to other charge pump stage topologies, including, e.g., single pump stage circuits and other double pump stage circuits.

Figure 4B:
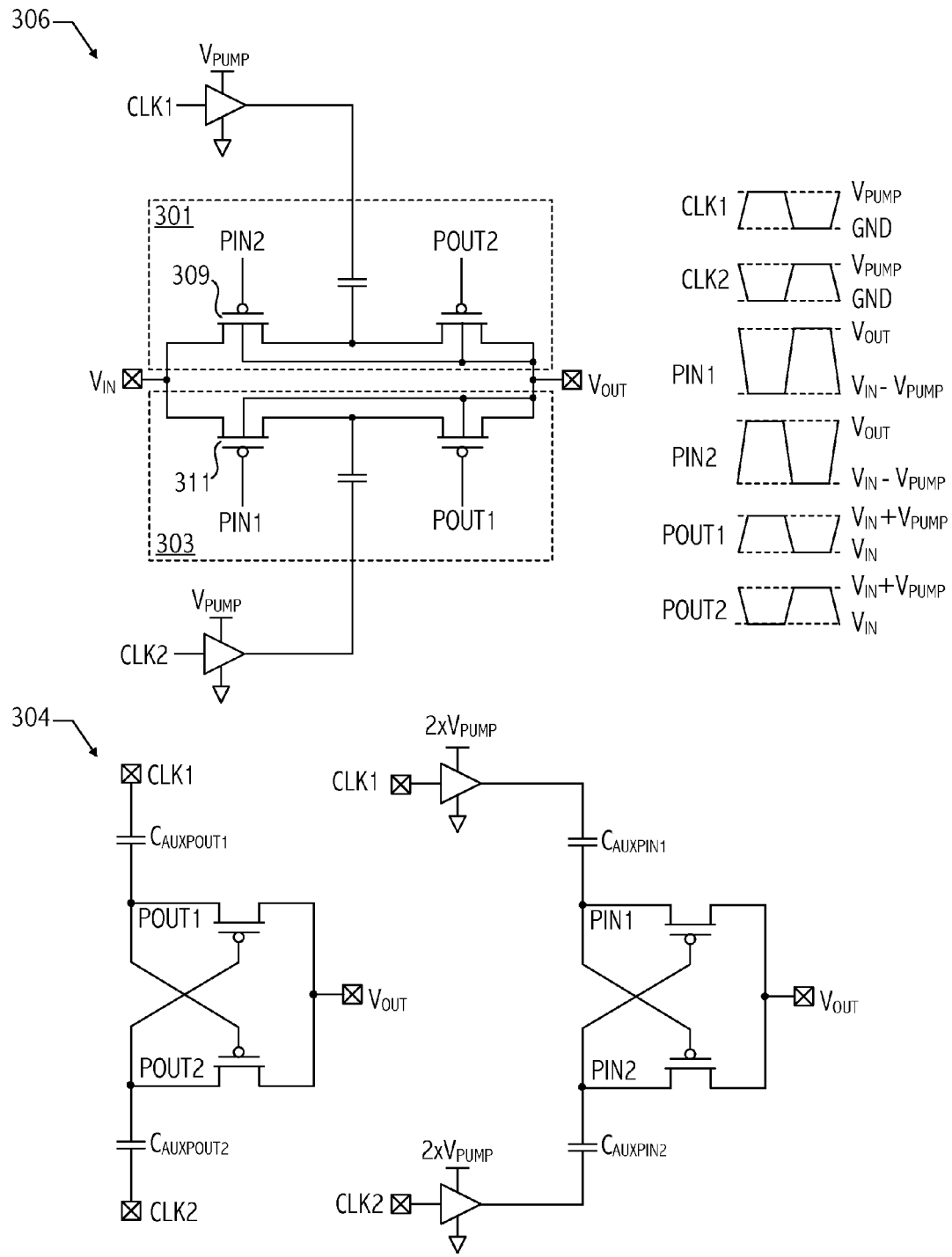
FIG. 4B illustrates circuit diagrams and associated signal waveforms of an embodiment of the charge pump stage including only p-type devices configured in a first mode of operation consistent with at least one embodiment of the invention.

Clock level-shifting stage 304 decouples the control of switches 309, 310, 311, and 312 of pump stage 306 from control of pumping capacitors $C_{MAIN}$. Thus, pump stage 306 is configurable to operate in various modes, including the charge pump mode illustrated in FIG. 4, a short-circuit mode illustrated in FIG. 5, and a switched-capacitor resistor mode illustrated by the configuration of pumping capacitors in FIG. 5 and the switch control signal waveforms of FIG. 4. Referring to FIG. 4, in the charge pump mode, capacitors $C_{MAIN1}$ and $C_{MAIN2}$ receive CLK1 and CLK2, respectively, and devices 309, 310, 311, and 312 receive control clocks NCLK1, PCLK1, NCLK2, and PCLK2, respectively. Clock level-shifting stage 304 receives CLK1 on $C_{AUXN1}$ and $C_{AUXP1}$ and receives CLK2 on $C_{AUXN2}$ and $C_{AUXP2}$ to generate NCLK1 and PCLK1 in-phase with CLK1 and NCLK2 and PCLK2 in-phase with CLK2.

In at least one embodiment of programmable charge pump 300, if programmable charge pump 300 is manufactured using a process that provides a deep n-well layer, the bulks of devices of pump stages 306 and clock level-shifting stages 304 are connected to their sources to reduce or eliminate the body effect. Other embodiments of programmable charge pump 300 manufactured using a process without a deep n-well layer may use only p-type devices. For example, referring to FIG. 4B, pump stage 306 includes branches 301 and 303 using only p-type devices and can be configured to operate in the various modes including the illustrated charge pump mode based on control clock signals PIN1, PIN2, POUT1, and POUT2 generated by a corresponding clock level-shifting stage 304.

Figure 5:
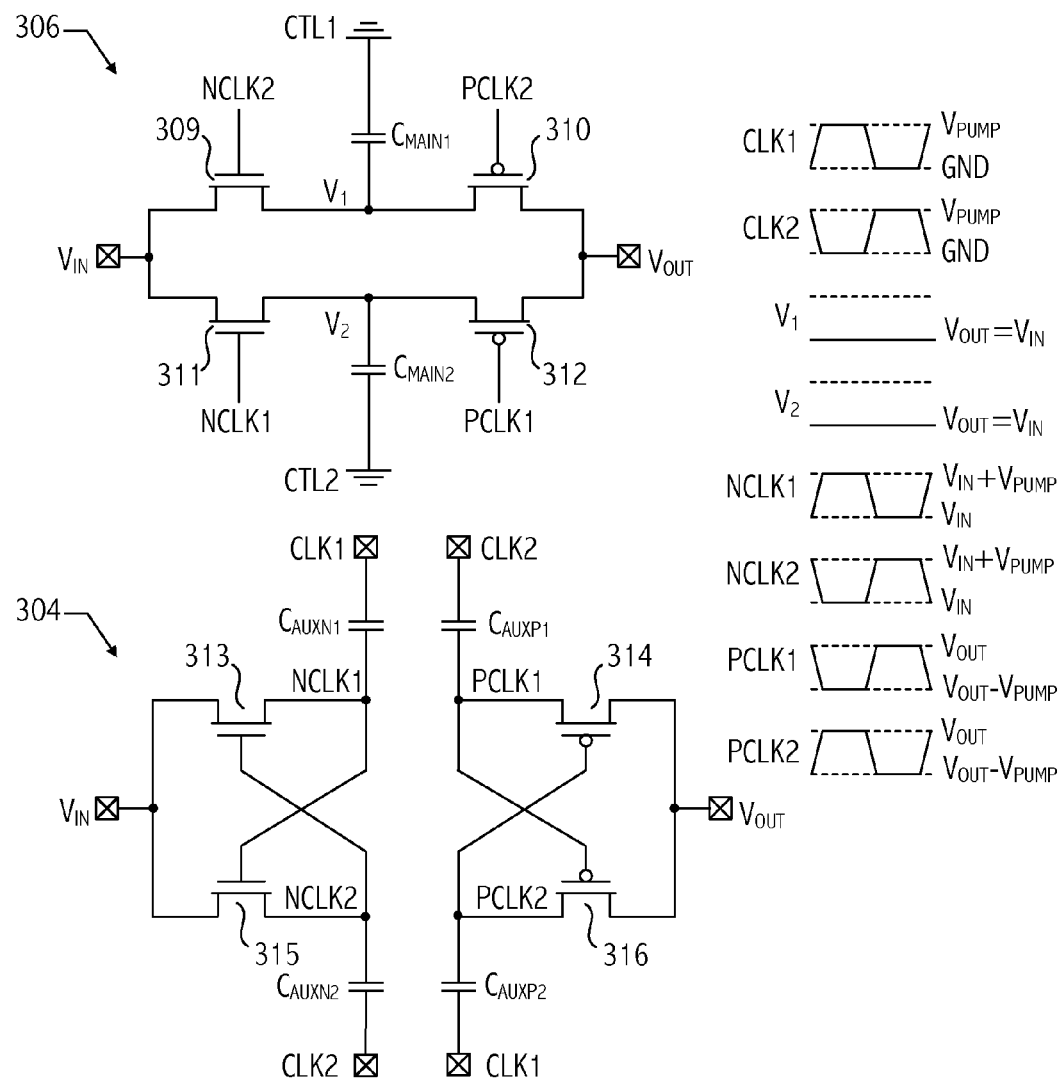
FIG. 5 illustrates circuit diagrams and associated signal waveforms of the charge pump stage of FIG. 3 configured as a short circuit in a second mode of operation consistent with at least one embodiment of the invention.

Referring to FIG. 5, in a short-circuit mode, pumping to the main capacitors $C_{MAIN1}$ and $C_{MAIN2}$ is disabled, e.g., by coupling main capacitors $C_{MAIN1}$ and $C_{MAIN2}$ to a ground voltage or other constant voltage level signal. Devices 309, 310, 311, and 312 receive control clocks NCLK1, PCLK1, NCLK2, and PCLK2, respectively. However, those control clocks have different phase relationships from the control signals of the charge pump mode. Still referring to FIG. 5, in at least one embodiment, clock level-shifting stage 304 receives CLK1 on $C_{AUXN1}$ and $C_{AUXP2}$ and receives CLK2 on $C_{AUXN2}$ and $C_{AUXP1}$ to generate NCLK1 and PCLK2 in-phase with CLK1 and NCLK2 and PCLK1 in-phase with CLK2. In other embodiments, in the short-circuit mode, rather than modifying the inputs to clock level-shifting stage 304, the control clock signals are generated as illustrated in FIG. 4, but are applied to different switches of pump stage 306.

Referring back to FIG. 5, in the short-circuit mode, devices 309, 310, 311 and 312 receive control clock signals NCLK1, PCLK1, NCLK2 and PCLK2. NCLK1 and PCLK1 are out-of-phase with each other, and NCLK2 and PCLK2 are out-of-phase with each other. As a result, devices 309 and 310 are on at the same time, thereby causing a short circuit between $V_{IN}$ and $V_{OUT}$. Devices 311 and 312 are on at the same time to cause a short circuit between $V_{IN}$ and $V_{OUT}$. In at least one embodiment of the short-circuit mode, devices of branch 301 are on during a first phase of CLK1 and off during the second phase while devices of branch 303 are off during a first phase of CLK1 and on during the second phase. However, other embodiments may enable the branches differently in short-circuit mode and/or may substitute the control clock signals NCLK1, NCLK2, PCLK1, and PCLK2 with constant control signals that configure one or both paths of charge pump 306 as short circuits.

In a switched-capacitor resistor mode, pumping to the main capacitors $C_{MAIN1}$ and $C_{MAIN2}$ of pump stage 306 is disabled, e.g., by coupling terminals coupled to main capacitors $C_{MAIN1}$ and $C_{MAIN2}$ to a ground voltage or other constant voltage level signal, as illustrated in FIG. 5. However, the clock control signals are generated and applied to devices 309, 310, 311, and 312 as illustrated in FIG. 4. That is, control clock signals are provided to complementary devices in an individual branch of the pump stage to cause those devices to be closed out-of-phase. As a result, pump stage 306 transfers charge from the input node $V_{IN}$ to the output node $V_{OUT}$ at a switching frequency of the control signals ($f_{CLK}$) to generate an equivalent resistance, e.g., $\frac{1}{2} \times f_{CLK} \times C_{MAIN}$ in response to those control clock signals where $C_{MAIN1} = C_{MAIN2} = C_{MAIN}$.

In addition, since the control signals for switches 309, 310, 311, and 312 of pump stage 306 are divorced from signals controlling pumping capacitors $C_{MAIN1}$ and $C_{MAIN2}$, the amplitudes of clock signals NCLK1, NCLK2, PCLK1, and PCLK2 do not need to correspond to the voltage drop across pump stage 306 and may be generated to use less power. For example, in an embodiment of charge pump stage 302, where $V_{DD}=3V$, instead of generating 3V amplitude signals, clock level-shifting stage 304 generates NCLK1, NCLK2, PCLK1, and PCLK2 to be 1.5 V amplitude signals. Clock signals NCLK1, NCLK2, PCLK1, and PCLK2 may have any amplitude sufficient to effectively turn on and off the devices of pump stage 306. In addition, the amplitudes of clock signals provided to pump stage 306 and clock signals provided to clock level-shifting stage 304 can be different. For example, CLK1 and CLK2 provided to clock level-shifting stage 304 can be set to levels that maximize efficiency while the CLK1 and CLK2 provided to pump stage 306 can be set to levels that change the output voltage level. Furthermore, CLK1 and CLK2 provided to pump stage 306 may be set to levels that achieve an output voltage level less than a device threshold level, thereby increasing the range of the voltage level output achieved by programmable charge pump 300. Referring back to FIG. 3, multiple charge pump stages 302 are cascaded to implement programmable charge pump circuit 300. Programmable charge pump circuit 300 is configurable to generate an output voltage level $V_{OUT}$ that is approximately $V_{IN}$ ($M \times V_{PUMP}$), where M is an integer $0 \leq M \leq N$, and N is the number of charge pump stages 302 included in programmable charge pump circuit 300. In at least one embodiment, global control circuit 310 configures each individual charge pump stage 302 to be included in a first set or a second set based on a predetermined target output voltage. Each of M charge pump stages in the first set of charge pump stages is configured to level-shift an input voltage to an output voltage level. Each of the N-M charge pump stages in the second set of charge pump stages has a disabled pump circuit portion, i.e., the pump stage 306 is configured either in short-circuit mode or switched-capacitor resistor mode, consistent with the description above.

For example, to obtain a target voltage level $V_{OUTPUT}=V_{INPUT}+(N \times V_{PUMP})$, a control module (e.g., control module 310) includes all N charge pump stages 302 in the first set and configures them as charge pumps, e.g., all pump stages 306 in the first set receive CLK1, CLK2, NCLK1, PCLK1, NCLK2, and PCLK2, as described above with regard to FIG. 4. As another example, to obtain a target voltage level $V_{OUTPUT}=V_{INPUT}$, the control module includes all N charge pump stages 302 in the second set and configures them as short circuits, e.g., all pump stages 306 receive constant voltage levels on $C_{MAIN1}$ and $C_{MAIN2}$, and NCLK1 is out-of-phase with PCLK1, and NCLK2 is out-of-phase with PCLK2, as described above with regard to FIG. 5. As yet another example, to pump the input voltage $V_{INPUT}$ to a target output voltage level $V_{OUTPUT}=V_{INPUT}+(M \times V_{PUMP})$, where M is an integer<N, the control module includes the first M charge pump stages 302 of programmable charge pump circuit 300 of FIG. 5 that are cascaded to the input node in the first set and configures them as charge pumps (e.g., consistent with FIG. 4). The control module includes the next N-M charge pump stages 302 of programmable charge pump circuit 300 of FIG. 5 in the second set and configures them as short circuits (e.g., consistent with FIG. 5). The integer M may be chosen based on efficiency considerations. For example, the control module chooses M to put greater voltages across each stage and uses a minimum number of charge pump stages 302 configured as charge pumps. Programmable charge pump circuit 300 can achieve other output voltage levels that may not be integer combinations of $V_{INPUT}$ and $V_{PUMP}$ by configuring one or more of the charge pump stages 302 to be switched-capacitor resistors, as described above, to attenuate intermediate voltage levels.

Figure 6:
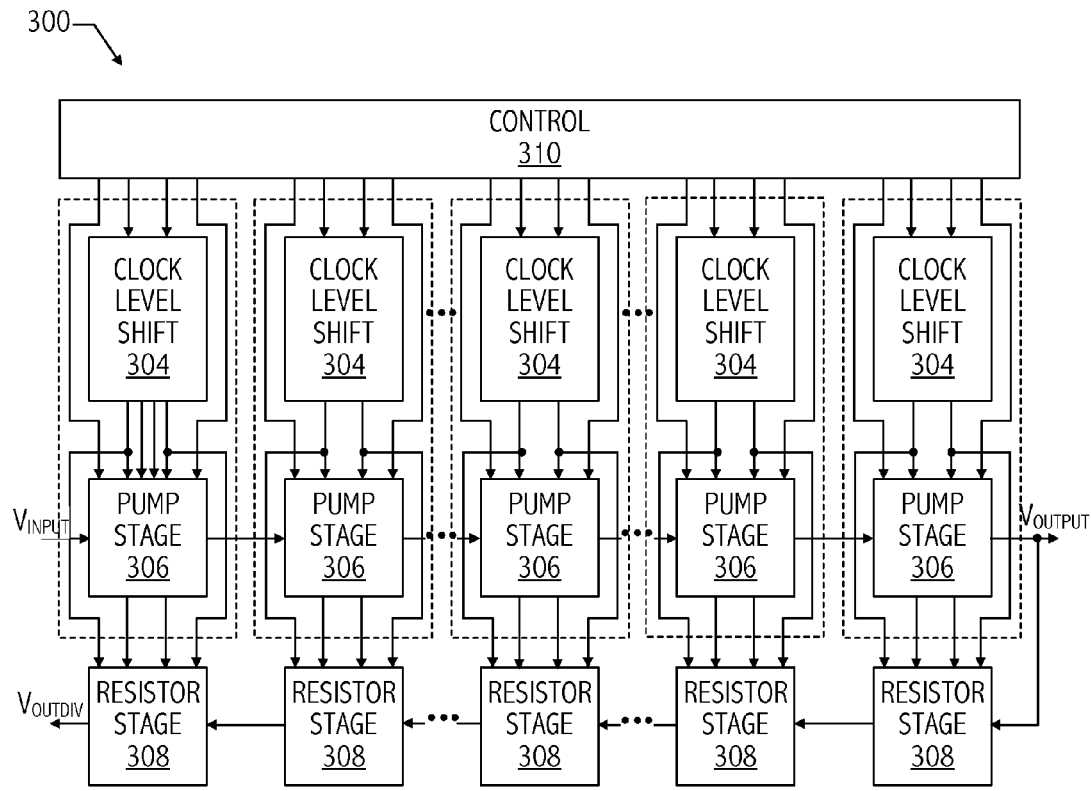
FIG. 6 illustrates a functional block diagram of a programmable charge pump circuit including feedback signal generation circuitry consistent with at least one embodiment of the invention.
Figure 7:
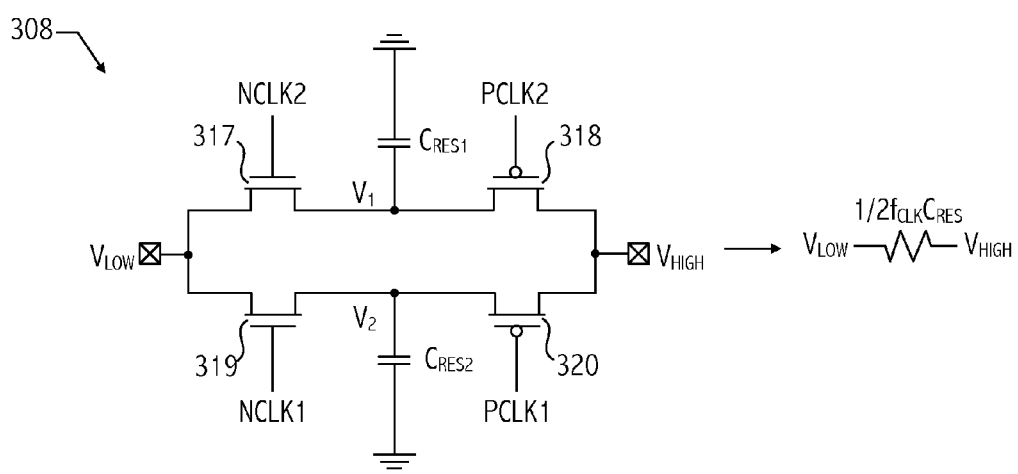
FIG. 7 illustrates a circuit diagram of individual resistor stages of the programmable charge pump circuit of FIG. 6, consistent with at least one embodiment of the invention.

Referring to FIG. 6, in at least one embodiment, programmable charge pump 300 also includes N resistor stages 308 configured to implement a resistor divider that may be configured to generate a feedback signal having normal circuit voltage levels and indicative of the actual voltage level $V_{OUTPUT}$. That feedback signal may be used to dynamically adjust operating parameters of programmable charge pump 300 (e.g., $V_{PUMP}$ and M). Referring to FIGS. 6 and 7, in at least one embodiment, programmable charge pump 300 includes a resistor stage 308 for each charge pump stage 302. The voltage levels on each node $V_{LOW}$ and $V_{HIGH}$ of each resistor stage 308 correspond to the voltage levels on $V_{IN}$ and $V_{OUT}$, respectively, of a corresponding charge pump stage 302. Thus, $V_{LOW}$ and $V_{HIGH}$ of a resistor stage 308 can be used to determine the actual pump voltage of an individual charge pump stage 302 (e.g., operating with process, voltage and temperature variations) and the actual total pump voltage implemented by programmable charge pump 300 can be sensed based on $V_{LOW}$ and $V_{HIGH}$ of resistor stages 308 and an output voltage level $V_{OUTDIV}$ generated by the cascaded resistor stages 308.

In at least one embodiment of programmable charge pump 300, the first M resistor stages 308 coupled to corresponding first M charge pump stages 302 are instantiations of pump stages 306 configured as switched-capacitor resistors that are configured to transfer charge from the input node $V_{HIGH}$ to the output node $V_{LOW}$ at a switching frequency of the control signals $f_{at}$ (to generate an equivalent resistance of $\frac{1}{2} \times f_{CLK} \times C_{RES}$. The voltage levels on each node $V_{LOW}$ and $V_{HIGH}$ of each resistor stage 308 indicate the voltage levels on $V_{IN}$ and $V_{OUT}$, respectively, of a corresponding charge pump stage 302. The next N-M resistor stages 308 coupled to corresponding N-M charge pump stages 302 are configured as short circuits, consistent with the configuration of pump stage 306 in FIG. 5. Those N-M resistor stages 308 pass $V_{HIGH}$ to $V_{LOW}$ without significant attenuation.

Figure 8:
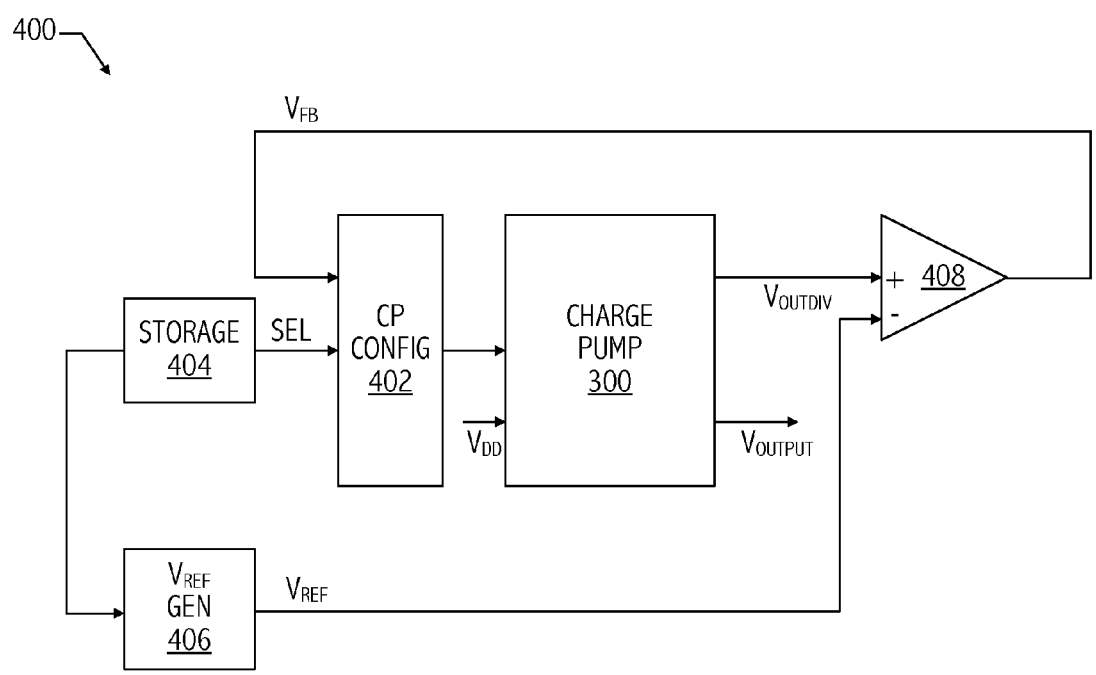
FIG. 8 illustrates a functional block diagram of a control loop including a programmable charge pump circuit consistent with at least one embodiment of the invention.

Referring to FIG. 8, a feedback control circuit includes a charge pump configuration module 402 (which may include control module 310 of FIG. 3) that assigns the N charge pump stages 302 of programmable charge pump 300 to the first set or the second set and configures the charge pump stages 302 accordingly, and/or configures the pump voltage of each individual charge pump stage 302. Charge pump configuration module 402 initially configures those N charge pump stages 302 and resistor stages 308, if any, based on predetermined values, e.g., target pump voltage levels stored in storage device 404 or otherwise provided to charge pump configuration module 402 (e.g., from memory, pins of an integrated circuit, or other suitable technique). During operation of programmable charge pump 300, the feedback control loop updates the number of charge pump stages 302 configured as charge pumps and/or updates the pump voltage of individual charge pump stages 302. That is, charge pump configuration module 402 adjusts M and configures N charge pump stages 302 and resistor stages 308, if any, accordingly.

For example, comparator 408 compares the voltage-divided output signal $V_{OUTDIV}$ to reference voltage level $V_{REF}$ and generates a feedback voltage $V_{FB}$ that indicates the difference between the voltage-divided output of programmable charge pump 300 and the reference voltage level $V_{REF}$. Reference voltage level $V_{REF}$ may be a fixed value generated by reference generator 406 or may be selectable based on a predetermined target voltage level, e.g., a value stored in storage device 404 or otherwise provided to reference generator 406. Charge pump configuration module 402 adjusts the pump voltage of individual charge pump stages 302 (e.g., by changing the voltage levels of control signals applied to $C_{MAIN1}$ and $C_{MAIN2}$ in pump stages 306) or adjusts the number of charge pump stages 302 configured as enabled charge pump stages and the number of disabled charge pump stages 302 (i.e., the number configured as short circuits or switched-capacitor resistors). For example, if $V_{FB}$ indicates a voltage difference that is greater than a first predetermined threshold value, then charge pump configuration module 402 reduces the pump voltage of individual charge pump stages 302 and/or reduces the number of charge pump stages 302 configured as charge pumps. If $V_{FB}$ indicates a voltage difference that is less than a second predetermined threshold value, then charge pump configuration module 402 increases the pump voltage of individual charge pump stages 302 and/or increases the number of charge pump stages 302 configured as charge pumps. Note that the first and second predetermined threshold values may be programmable by any suitable technique.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an embodiment in which double CMOS charge pump stages are used, one of skill in the art will appreciate that the teachings herein can be utilized with single charge pump stages and/or pump stages using PMOS only devices. Variations and modifications of the embodiments disclosed herein may be made based on the description set forth herein, without departing from the scope and spirit of the invention as set forth in the following claims.

What is claimed is:

1. A method of operating a programmable charge pump comprising:
    configuring each of a plurality of cascaded charge pump stages to be in a first set of charge pump stages or in a second set of charge pump stages based on an indicator of a target output voltage level, the first set of charge pump stages being configured to level-shift a first voltage level to a second voltage level, each charge pump stage of the second set of charge pump stages having a disabled pump circuit portion, the second set of charge pump stages being configured to pass a version of the second voltage level to an output node of the programmable charge pump; and
    adjusting a pump voltage of an individual charge pump stage of the first set of charge pump stages based on a feedback signal generated by a plurality of cascaded switched-capacitor stages in response to a voltage level on the output node and the indicator of the target output voltage level, the pump voltage being a difference between an input voltage level of the individual charge pump stage and an output voltage level of the individual charge pump stage.

2. The method, as recited in claim 1, further comprising:
    level-shifting the first voltage level to the second voltage level using the first set of charge pump stages.

3. The method, as recited in claim 1, wherein each charge pump stage of the second set of charge pump stages is configured as a short circuit, the method further comprising:
    passing the version of the second voltage level to the output node using the second set of charge pump stages, the voltage level on the output node being approximately the same as the second voltage level.

4. The method, as recited in claim 1, wherein each charge pump stage of the second set of charge pump stages is configured as a switched-capacitor resistor, the method further comprising:
    passing the version of the second voltage level to the output node using the second set of charge pump stages, the voltage level on the output node being an attenuated version of the second voltage level.

5. The method, as recited in claim 1, further comprising:
    reconfiguring at least one of the plurality of charge pump stages based on the feedback signal.

6. The method, as recited in claim 1, further comprising:
    configuring each of a plurality of cascaded switched-capacitor stages to be in a third set of switched-capacitor stages or in a fourth set of switched-capacitor stages based on the indicator of the target output voltage level, individual switched-capacitor stages of the third set of switched-capacitor stages corresponding to respective charge pump stages of the first set of charge pump stages and being configured as switched capacitor resistors, individual switched-capacitor stages of the fourth set of switched-capacitor stages corresponding to respective charge pump stages of the second set of charge pump stages and being configured as short circuits;
    passing the voltage level on the output node to the third set of switched-capacitor stages using the fourth set of switched-capacitor stages; and
    voltage dividing a version of the voltage level on the output node using the third set of switched-capacitor stages.

7. A method of operating a programmable charge pump comprising:
    configuring each of a plurality of cascaded charge pump stages to be in a first set of charge pump stages or in a second set of charge pump stages based on an indicator of a target output voltage level, the first set of charge pump stages being configured to level-shift a first voltage level to a second voltage level, each charge pump stage of the second set of charge pump stages having a disabled pump circuit portion, the second set of charge pump stages being configured to pass a version of the second voltage level to an output node of the programmable charge pump; and
    operating each of the plurality of charge pump stages based on a corresponding first control signal, corresponding second control signal, and corresponding third control signal,
    wherein for each charge pump stage of the first set of charge pump stages the operating comprises level-shifting a first voltage level of a signal on an input node of the charge pump stage to a second voltage level on an output node of the charge pump stage in response to the corresponding first and second control signals, and the corresponding third control signal oscillating between a third voltage and a fourth voltage, and
    wherein for each charge pump stage of the second set of charge pump stages, the operating comprises providing a version of the first voltage level of a signal on an input node of the charge pump stage to the output node of the charge pump stage in response to the corresponding third control signal being a fixed signal.

8. The method, as recited in claim 7, further comprising:
    generating the corresponding first and second control signals oscillating out-of-phase with each other based on a first clock signal, wherein for each charge pump stage of the plurality of charge pump stages, the corresponding first and second control signals oscillate between a corresponding first voltage level and a corresponding second voltage level, the corresponding first and second voltage levels increasing with each successive charge pump stage.

9. The method, as recited in claim 8,
    wherein in an individual charge pump stage of the second set of charge pump stages, the operating comprises passing the voltage on the corresponding first node to the corresponding second node in response to corresponding first and second control signals oscillating in-phase, and
    wherein in an individual charge pump stage of the second set of charge pump stages, the operating comprises transferring charge from the corresponding input node to the corresponding output node at a switching frequency to generate an equivalent resistance in response to the corresponding first and second controls signals oscillating out-of-phase with each other.

10. The method, as recited in claim 8, wherein in the second set of charge pump stages, the first clock signal and the corresponding first and second control signals are two-phase clock signals and the operating comprises transferring charge to the output node by alternating between two parallel circuit paths controlled using different phases of the two-phase clock signals.

11. An apparatus comprising:
a plurality of cascaded charge pump stages; and
a control circuit operable to configure each of the plurality of cascaded charge pump stages to be in one of a first set of charge pump stages or a second set of charge pump stages based on an indicator of a target output voltage level, each charge pump stage in the first set of charge pump stages being configured to level-shift a first voltage level to a second voltage level, each charge pump stage in the second set of charge pump stages having a disabled pump circuit portion and the second set of charge pump stages being configured to pass a version of the second voltage level to an output node,
wherein the second set of charge pump stages are configured as switched-capacitor resistors.

12. The apparatus, as recited in claim 11, wherein charge pump stages in the first set of charge pump stages are configured to successively level-shift the first voltage level to the second voltage level.

13. The apparatus, as recited in claim 11, further comprising:
a comparator circuit configured to compare a feedback signal to a reference voltage level and generate an indicator thereof.

14. The apparatus, as recited in claim 11, wherein the control circuit is further operable to reconfigure at least one of the plurality of charge pump stages based on the feedback signal.

15. The apparatus, as recited in claim 11, wherein the control circuit is configured to adjust a pump voltage of individual charge pumps of the first set of charge pump stages based on the feedback signal.

16. An apparatus comprising:
a plurality of cascaded charge pump stages;
a control circuit operable to configure each of a plurality of the cascaded charge pump stages to be in one of a first set of charge pump stages or a second set of charge pump stages based on an indicator of a target output voltage level, each charge pump stage in the first set of charge pump stages being configured to level-shift a first voltage level to a second voltage level, each charge pump stage in the second set of charge pump stages having a disabled pump circuit portion and the second set of charge pump stages being configured to pass a version of the second voltage level to an output node, and
a plurality of cascaded switched-capacitor stages configured to generate a feedback signal,
wherein the control circuit is further operable to configure each of the plurality of cascaded switched-capacitor stages to be in a third set of switched-capacitor stages or in a fourth set of switched-capacitor stages based on the indicator of the target output voltage level, individual switched-capacitor stages of the third set of switched-capacitor stages corresponding to respective charge pump stages of the first set of charge pump stages and being configured to voltage divide a version of the voltage level on the output node using the third set of switched-capacitor stages, individual switched-capacitor stages of the fourth set of switched-capacitor stages corresponding to respective charge pump stages of the second set of charge pump stages and being configured as short circuits to pass the voltage level on the output node to the third set of switched-capacitor stages.

17. The apparatus, as recited in claim 16, wherein charge pump stages in the second set of charge pump stages are configured as short circuits.

18. The apparatus, as recited in claim 16, wherein charge pump stages in the second set of charge pump stages are configured as switched-capacitor resistors.

19. The apparatus, as recited in claim 16, wherein the second voltage level is the first voltage level boosted by n times the pump voltage and n is the number of charge pump stages in the first set of charge pump stages.

20. The apparatus, as recited in claim 16, wherein each of the plurality of charge pump stages comprises:
a first input node;
a first output node;
a first control circuit configured to generate a first control signal and a second control signal based on a first clock signal and a first voltage on the first input node and a second voltage on the first output node; and
a first pump circuit being configured to level-shift the first voltage level on the first input node to a second voltage level on the first output node in response to receiving the first clock signal on a first pump node and in response to the first and second control signals in a first mode and being configured to pass the first voltage level to the output node in response to receiving a stable signal on the first pump node and in response to the first and second control signals in a second mode.

21. The apparatus, as recited in claim 20, further comprising:
wherein the first control circuit is a latch-based charge pump circuit, and
the first pump circuit is a switched-capacitor charge pump circuit.

22. A method of operating a charge pump comprising:
operating a charge pump stage in a mode of operation selected from a plurality of modes of operation based on a first control signal, a second control signal, and a third control signal, the plurality of modes including a first mode and a second mode,
wherein in the first mode, the operating includes level-shifting a first voltage level of a signal on an input node to a second voltage level on an output node in response to the first and second control signals being clock signals having a first amplitude and a first phase relationship, and the third control signal being a first clock signal oscillating between a third voltage and a fourth voltage, and
wherein in the second mode, the operating includes providing a version of the first voltage level to the output node in response to the first and second control signals having a second phase relationship, and the third control signal being a fixed signal.

23. The method, as recited in claim 22, further comprising:
generating the first and second control signals based on the first clock signal,
wherein in the first mode, the first and second control signals oscillate between the first voltage level and the second voltage level,
wherein in the second mode, the first control signal oscillates between the first voltage level and a voltage level that is the sum of the first voltage level and the fourth voltage level; and
wherein in the second mode, the first and second control signals have the first phase relationship and oscillate between the second voltage level and a voltage level that is the difference between the second voltage level and the fourth voltage level.

24. The method, as recited in claim 23, wherein the plurality of modes includes a third mode, and wherein in the third mode, the operating includes transferring charge from the input node to the output node at a switching frequency to generate an equivalent resistance in response to the first and second control signals having the first phase relationship and the third control signal being a fixed signal.

25. The method, as recited in claim 24, further comprising:
using the output of the charge pump stage as a feedback signal in a control loop configured to adjust a boost voltage of a second charge pump stage operating in the first mode of operation, the boost voltage being a difference between a corresponding first voltage level and a corresponding second voltage level of the second charge pump stage.

26. The method, as recited in claim 24, further comprising:
using the output of the charge pump stage as a feedback signal in a control loop configured to adjust a total number of charge pump stages operating in the first mode in the charge pump.

* * * * *